United States Patent [19]
Gonda et al.

[11] Patent Number: 5,461,139
[45] Date of Patent: Oct. 24, 1995

[54] BIODEGRADABLE OPTICALLY ACTIVE COPOLYMERS AND PROCESSES FOR PRODUCING THE SAME

[75] Inventors: Yoshiharu Gonda; Yoji Hori; Akio Yamaguchi, all of Kanagawa; Takao Nishishita, Tokyo, all of Japan

[73] Assignee: Takasago International Corporation, Tokyo, Japan

[21] Appl. No.: 287,916

[22] Filed: Aug. 9, 1994

[30] Foreign Application Priority Data

Aug. 11, 1993 [JP] Japan .................................... 5-217929

[51] Int. Cl.⁶ .......................... C08G 63/06; C08G 63/08
[52] U.S. Cl. .......................... 528/361; 528/354; 528/357
[58] Field of Search .................................... 528/354, 357, 528/361

[56] References Cited

U.S. PATENT DOCUMENTS 4,788,979  12/1988  Jarrett et al. ............................ 528/354

FOREIGN PATENT DOCUMENTS 9313154  7/1983  WIPO.
8905664  6/1989  WIPO.
4131187  3/1993  WIPO.

OTHER PUBLICATIONS

Phys. Technol., vol. 16 pp. 32–36 (1985).
Polymer Letters, vol. 9, pp. 173–178 (1971).
Macromolecules 1990, 23, pp. 3206–3212.
Macromolecules 1991, 24, pp. 5732–5733.
J. Polym. Sci., Part A, "Polym. Chem.", 32, (2), pp. 265–279 (1994).
J. Macromol. Sci.–Pure Appl. Chem., A29, (10), pp. 915–930 (1992).
Macromolecules, vol. 26, No. 16, Aug. 2, 1993, pp. 4388–4390.

*Primary Examiner*—Shelley A. Dodson
*Attorney, Agent, or Firm*—Sughrue, Mion, Zinn, Macpeak & Seas

[57] ABSTRACT

A biodegradable optically active copolymer is disclosed, which is represented by the general formula (I):

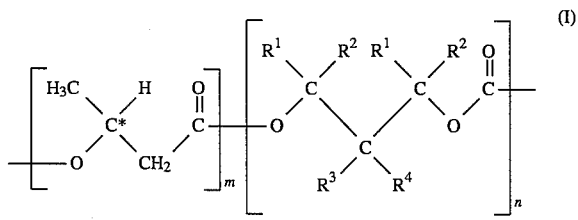

wherein $R^1$, $R^2$, $R^3$ and $R^4$ each represents a hydrogen atom or a methyl group; m and n each represents a natural number wherein the sum thereof gives 10 to 5,000; and C* represents an asymmetric carbon atom, and a process for producing the copolymer by ring-opening copolymerization of optically active β-butyrolactone with a cyclic carbonate in the presence of catalyst. The biodegradable optically active copolymer of the present invention provides excellent biodegradability (enzyme degradability) and hydrolyzability.

14 Claims, No Drawings

BIODEGRADABLE OPTICALLY ACTIVE COPOLYMERS AND PROCESSES FOR PRODUCING THE SAME

FIELD OF THE INVENTION

The present invention relates to a biodegradable optically active copolymer and a process for producing the same, and more particularly to a biodegradable optically active copolymer obtained by ring-opening copolymerization of optically active β-butyrolactone with various cyclic carbonates and a process for producing the same.

BACKGROUND OF THE INVENTION

Thermoplastic resins called biodegradable polymers which have characteristics such as enzyme degradability, hydrolyzability and biocompatibility have hitherto been known, and have been given particular attention as functional polymers utilizing their excellent properties.

As one example of the biodegradable polymers, poly((R)-3-hydroxybutyric acid), a polymer accumulated in microorganisms, has been known. Further, the presence of a number of microorganisms which accumulate polymers of various (R)-3-hydroxyalkanoic acids (hereinafter abbreviated as "(R)- 3-HA") in their cells has also been known (P. A. Holmes, *Phys. Technol.*, Vol. 16, pp. 32–36, 1985; *Seibunkaisei Kobunshi Zairyo (Biodegradable Polymer Materials)*, edited by Yoshiharu Doi, Kogyo Chosakai, pp. 26–30, Nov. 9, 1990).

Since the polymers accumulated in these microorganisms are easily degraded by microorganisms existing in soil and water, they can be widely used as clean plastics free of environmental pollution (*Seibunkaisei Kobunshi Zairyo (Biodegradable Polymer Materials)*, edited by Yoshiharu Doi, Kogyo Chosakai, pp. 19–26, Nov. 9, 1990).

As methods for producing those polymers, first, methods utilizing the above-mentioned microorganisms have been considered. However, they have the disadvantage of requiring complex processes such as the separation of the polymers from cells, resulting in high cost of production, because of the utilization of the microorganisms or enzyme reaction. Further, most of the polymers produced contain (R)-3-HA units and 4-hydroxybutyric acid units, and polymers containing carbonate units have not been reported.

On the other hand, chemical synthesis methods are known as other methods for producing the biodegradable polymers. For example, ring-opening polymerization of optically active β-butyrolactone has been reported in some documents [*Polymer Letters*, 9, 173 (1971); *Macromolecules*, 23, 3206 (1990); *Macromolecules*, 24, 5732 (1991)].

These methods do not require complex processes such as those in microbiological synthesis, but have many industrial problems of low molecular weight of the polymers obtained and low catalytic reactivity, which results in high cost of production.

Now, polymers composed of cyclic carbonates and lactones have already been known. For example, JP-A-3-502651 (the term "JP-A" as used herein means an "unexamined published Japanese patent application") states clearly the production of copolymers of cyclic carbonates with lactones, particularly butyrolactone. However, in this patent specification, units derived from the cyclic carbonates are only represented by a general formula as units constituting the copolymers, and the lactones are also only represented by a general formula. Further, copolymerization of ε-caprolactone with 1,3-dioxan- 2-one, a cyclic carbonate, is disclosed in JP-A-1-284262.

However, neither of these patent specifications describes the optical activity of the monomers used and copolymers formed, or teaches or suggests such optically active polymers as proposed by the present invention.

Thus, the biodegradable optically active copolymers which are ring-opening copolymers of optically active β-butyrolactone with cyclic carbonates and efficient processes for producing the copolymers have hitherto been unknown.

SUMMARY OF THE INVENTION

An object of the present invention is therefore to provide a novel biodegradable optically active copolymer excellent in biodegradability and hydrolyzability, and to provide a commercially advantageous process for producing the same.

As a result of intensive studies for solving the above-mentioned problems, the present inventors have discovered that the copolymers of optically active β-butyrolactone with cyclic carbonates are excellent in biodegradability and hydrolyzability which enables one to use them as biodegradable polymers, and the copolymers are commercially advantageous because they are readily obtained by ring-opening copolymerization of optically active β-butyrolactone with cyclic carbonates in the presence of particular catalysts, thus completing the present invention.

The present invention provides a biodegradable optically active copolymer represented by general formula (I):

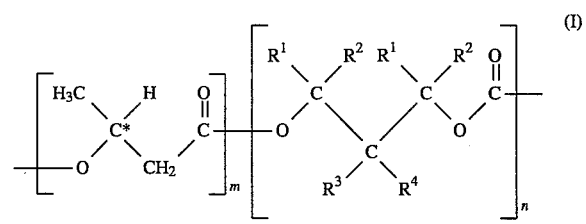

wherein $R^1$, $R^2$, $R^3$ and $R^4$ each represents a hydrogen atom or a methyl group; m and n each represents a natural number wherein the sum thereof gives 10 to 5,000; and C* represents an asymmetric carbon atom.

Further, the present invention provides a process for producing the above-mentioned biodegradable optically active copolymer by ring-opening copolymerization of optically active β-butyrolactone with a cyclic carbonate in the presence of a catalyst.

DETAILED DESCRIPTION OF THE INVENTION

The biodegradable optically active copolymer of the present invention is a copolymer composed of an optically active butyrolactone unit represented by the following general formula (II):

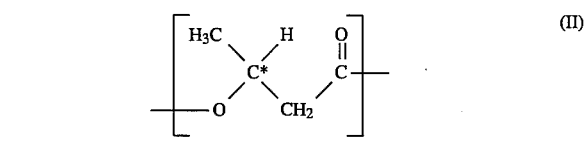

wherein C* has the same meaning as given above, and a cyclic carbonate unit represented by the following general formula (III):

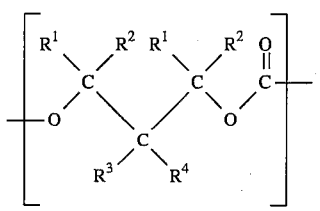
(III)

wherein $R^1$, $R^2$, $R^3$ and $R^4$ have the same meanings as given above.

The sum (m+ n) of the number (m) of unit (II) and the number (n) of unit (III) ranges from 10 to 5,000, and more preferably from 500 to 3,000. In this case, m is preferably from 100 to 2,900 and n from 100 to 2,900.

In unit (III), $R^1$ to $R^4$ are suitably all hydrogen atoms, or hydrogen atoms and methyl groups.

The weight-average molecular weight of the copolymers of the present invention is preferably from 8,000 to 1,000,000, and more preferably from 50,000 to 500,000.

The copolymers of the present invention can be prepared by ring-opening copolymerization of optically active β-butyrolactone (hereinafter referred to as "β-butyrolactone") with cyclic carbonates in the presence of catalysts.

As β-butyrolactone which is a starting material in the present invention, both the R-form and the S-form optically active substances can be employed according to the use of the copolymers; however, particularly, the R-form lactone is preferably used. Further, β-butyrolactone having a wide range of optical purity may be employed.

β-Butyrolactone described above can be prepared according to the method of T. Ohta et al. (*J. Chem. Soc., Chem. Commun.*, pp. 1725–1726, 1992). Specifically, it is readily obtained by asymmetric hydrogenation of 4-methylene-2-oxetanone using a ruthenium-optically active phosphine complex as a catalyst, preferably in the presence of a tertiary amine.

Examples of the cyclic carbonates, each of which is another starting material of the copolymer of the present invention, include 1,3-dioxan-2-one, 4,4-dimethyl-1,3-dioxan-2-one, 4-methyl-1,3-dioxan-2-one, 5-methyl-1,3-dioxan-2-one, 4,5-dimethyl-1,3-dioxan-2-one, 4,6-dimethyl-1,3-dioxan-2-one, 4,5,6-trimethyl-1,3-dioxan-2-one, and 4,5,5,6-tetramethyl-1,3-dioxan-2-one.

These cyclic carbonates are readily prepared by adding dropwise triethylamine to toluene solutions of the corresponding diols and ethyl chloroformate in ice baths.

In the present invention, at least one kind of cyclic carbonate is used, and several kinds of cyclic carbonates may be used in combination, as needed.

In the production of the copolymers of the present invention, the molar ratio of β-butyrolactone to the cyclic carbonates is 99–1:1–99, and the higher ratio of β-butyrolactone to the cyclic carbonates is liable to bring about the biodegradation of the resulting copolymers. Introduction of an alkyl group having two or more carbon atoms into the cyclic carbonate as a substituent unfavorably results in a lowered rate of biodegradation.

Other monomer units may be allowed to coexist in the molecules of the copolymers, as long as the desired object and effect of the invention are not impaired.

Specifically, the ring-opening copolymerization of β-butyrolactone with the cyclic carbonate is carried out by putting both the starting materials at an appropriate ratio within the above-mentioned range into a reaction vessel under an inert gas such as nitrogen or argon, adding a catalyst mentioned below to this mixture, and then reacting them at ordinary pressure at a temperature of 60° to 120° C. for 1 hour to 2 days, and more preferably at a temperature of 70° to 100° C. for 2 to 18 hours.

Tin-based, aluminum-based, and zinc-based catalysts can be used as the catalysts for the above-mentioned copolymerization. Examples of the tin-based catalysts include dibutyltin oxide, tin dioctylate, dibutyltin dilaurate, and distannoxane catalysts. Examples of the aluminum-based catalysts include triethylaluminum-water, methylalumoxane, and ethylalumoxane. Examples of the zinc-based catalysts include diethylzinc-water, diethylzinc-ethylene glycol, diethylzinc-methanol, and diethylzinc-ethanol.

Of these, distannoxane catalysts represented by the following general formula (IV) are particularly preferred:

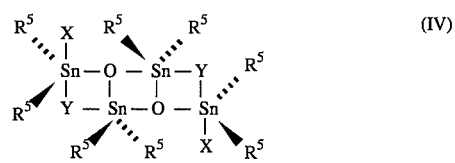
(IV)

wherein $R^5$ represents a lower alkyl group or a phenyl group; X represents a halogen atom or —NCS; and Y represents a halogen atom, a hydroxyl group, a lower alkoxyl group, a phenoxy group or —NCS. Examples of the distannoxane catalysts represented by the above-mentioned formula (IV) include 1,3-dichloro- 1,1,3,3-tetrabutyldistannoxane (the indication of the substituted positions of tetraalkyl or tetraphenyl groups are hereinafter omitted like "1,3-dichlorotetrabutyldistannoxane"), 1,3-dichloro-tetraphenyldistannoxane, 1,3-dibromotetrabutyldistannoxane, 1-chloro-3-hydroxytetrabutyldistannoxane, 1-bromo-3-hydroxytetrabutyldistannoxane, 1 -chloro-3-ethoxytetrabutyldistannoxane, 1-chloro-3-phenoxytetrabutyldistannoxane, 1-bromo-3-phenoxytetrabutyldistannoxane, 1-chloro-3-(isothiocyanato)tetrabutyldistannoxane, 1-hydroxy-3-(isothiocyanato)tetrabutyldistannoxane, 1-(isothiocyanato)-3-methoxytetrabutyldistannoxane, 1-(isothiocyanato)-3-phenoxy-tetrabutyldistannoxane, 1,3-bis(isothiocyanato)tetrabutyl-distannoxane, and 1,3-bis(isothiocyanato)tetramethyldistannoxane.

The above-mentioned distannoxane derivatives are readily synthesized according to known methods. For example, 1,3-dichlorotetrabutyldistannoxane can be obtained by adding pyridine to an ethanol solution of dibutyltin dichloride, and then adding water dropwise to the solution. 1-Hydroxy-3 -(isothiocyanato)tetrabutyldistannoxane is readily synthesized by reacting dibutyltin oxide with dibutyltin isothiocyanate in ethanol.

For the above-mentioned ring-opening copolymerization, at least one of these catalysts may be used, but several kinds of them can be used in combination, as needed. The amount of these catalysts added varies depending upon the kind of catalyst and other reaction conditions. In general, however, it preferably ranges from $1/40,000$ to $1/100$, and more preferably from $1/20,000$ to $1/1,000$ in molar ratio, based on the starting materials, β -butyrolactone and the cyclic carbonate.

The degree of polymerization of the copolymers obtained can be changed from about 10 to 5,000 by regulating the amount of the catalysts, and the kind and amount of the monomers.

The copolymers thus prepared of the present invention are thermoplastic resins showing characteristics such as enzyme degradability, hydrolyzability and biocompatibility, because of the presence of the optically active β-butyrolactone units in the copolymer molecules.

Accordingly, they can be utilized as functional polymers, and are particularly useful as molding materials and medical materials. They are useful as surgical sutures, among others.

The copolymers of the present invention prepared by ring-opening copolymerization of β-butyrolactone with the various carbonates are optically active, and are characterized by biodegradability (enzyme degradability) and hydrolyzability. They are therefore useful as novel functional materials capable of controlling the rate of biodegradation, for molding materials and medical materials.

Further, according to the present invention, the biodegradable copolymers can be completely industrially produced without the use of microorganisms or enzymes obtained therefrom, so that the present invention is commercially advantageous.

According to the processes for producing the copolymers of the present invention, the molecular weight of the resulting copolymers can be controlled over a wide range by the selection of the catalysts, etc. and the resulting copolymers retain the optical purity of β-butyrolactone, the starting material. They therefore have the advantages that the physical properties thereof such as the melting point can be freely controlled by the selection of the steric configurations of β-butyrolactone, and that the rate of degradation of the copolymers can be adjusted by changing the proportion of the R-form units in the copolymer molecules.

The present invention is illustrated with reference to the following examples and test examples in more detail, but these examples and test examples are not to be construed to limit the scope of the invention.

Analytical instruments used in the examples and test examples of the present specification are as follows:

(1) Nuclear magnetic resonance spectrum ($^1$H-NMR): AM- 400 type apparatus (400 MHz) (manufactured by Bruker, Inc.).

(2) Molecular weight: D-2520GPC integrator (manufactured by Hitachi, Ltd.)

(3) Optical rotation: DIP-360 type digital polarimeter (manufactured by JASCO Inc.)

(4) Differential scanning calorimeter (DSC): DSC50 (manufactured by Shimadzu Corp.)

(5) Thermogravimetric analyzer (TGA): TGA50 (manufactured by Shimadzu Corp.)

Example 1

Synthesis of Poly(Ester Carbonate) by Reaction of (R)-β-Butyrolactone (hereinafter abbreviated as "βBL") with 1,3-Dioxan-2-one (hereinafter abbreviated as "TMC"):

(1) Synthesis of (R)-βBL

Into a 100-ml stainless steel autoclave was placed 17.1 mg (0.01 mmol) of $Ru_2Cl_4((-)-Tol-BINAP)_2N(CH_2CH_3)_3$ (wherein Tol-BINAP represents 2,2'-bis(di-p-tolylphosphino)- 1,1'-binaphthyl) which was precisely weighed in an atmosphere of nitrogen, and 10 ml of tetrahydrofuran was then added to dissolve the complex. To this was added 2.42 mg (0.02 mmol) of dimethylaniline, and the mixture was stirred at 50° C. for 20 minutes. To this solution was added 1.7 g (20.0 mmol) of 4-methylene-2-oxetannone, and the mixture was stirred under a hydrogen pressure of 100 atm at a reaction temperature of 60° C. for 60 hours.

The reaction solution obtained was distilled using a Claisen distillation apparatus to obtain 1.64 g (yield: 95.0%) of a fraction at a boiling point of 71 to 73° C./29 mm Hg. The product was subjected to solvolysis in methanol (methanolysis), and then converted into the ester of methoxytrifluoromethylphenylacetic acid, followed by measurement of $^1$H-NMR thereof. The optical purity was determined to be 91% ee from the ratio of diastereomers in the measurement.

(2) A mixture of 3.64 g (42.3 mmol) of (R)-βBL, 0.48 g (4.70 mmol) of TMC and 0.0132 g (0.012 mmol) of 1-chloro-3 -ethoxytetrabutyldistannoxane was stirred at 80° C. for 17 hours in an atmosphere of argon in a 20-ml reaction vessel. The product was dissolved in chloroform and the resulting solution was poured into a mixed solvent of diethyl ether and hexane. The product was reprecipitated to obtain 3.48 g (yield: 84.5%) of the titled polymer.

$^1$H-NMR (400 MHz, $CDCl_3$) δ ppm:
(R)-βBL Moiety;
1.32 (3H, d, J=6.3 Hz), 2.43–2.53 (1H, m), 2.55–2.67 (1H, m), 5.10–5.30 (1H, m)
TMC Moiety;
1.98–2.03 (2H, m), 4.16–4.24 (4H, m)

Example 2

Synthesis of Poly(Ester Carbonate) by Ring-Opening Copolymerization of (R)-βBL with TMC:

Reaction was carried out in the same manner as with Example 1 (2), with the exception that 2.81 g (32.6 mmol) of (R)-βBL, 0.37 g (3.62 mmol) of TMC and 0.0101 g (0.009 mmol) of 1-hydroxy-3-(isothiocyanato)tetrabutyldistannoxane were used, to obtain 2.82 g (yield: 88.7%) of the titled polymer.

Example 3

Synthesis of Poly(Ester Carbonate) by Ring-Opening Copolymerization of (R)-βBL with TMC:

Reaction was carried out in the same manner as with Example 1 (2), with the exception that 1.96 g (22.8 mmol) of (R)-βBL, 2.33 g (22.8 mmol) of TMC and 0.0128 g (0.011 mmol) of 1-chloro-3-ethoxytetrabutyldistannoxane were used, to obtain 4.20 g (yield: 98.0%) of the titled polymer.

Example 4

Synthesis of Poly(Ester Carbonate) by Ring-Opening Copolymerization of (R)-βBL with TMC:

Reaction was carried out in the same manner as with Example 1 (2), with the exception that 0.517 g (6.00 mmol) of (R)-βBL, 2.45 g (24.0 mmol) of TMC and 0.084 g (0.0075 mmol) of 1-chloro-3-ethoxy-tetrabutyldistannoxane were used, to obtain 2.90 g (yield: 97.7%) of the titled polymer.

Example 5

Synthesis of Poly(Ester Carbonate) by Ring-Opening Copolymerization of (R)-βBL with 5,5-Dimethyl-1,3 -dioxan-2-one (hereinafter abbreviated as "DMC"):

Reaction was carried out in the same manner as with Example 1 (2), with the exception that 3.64 g (42.3 mmol) of (R)-βBL, 0.29 g (2.23 mmol) of DMC and 0.0125 g (0.011 mmol) of 1-chloro-3-ethoxytetrabutyldistannoxane were used, to obtain 3.73 g (yield: 94.9%) of the titled polymer.

$^1$H-NMR (400 MHz, $CDCl_3$) δ ppm:
(R)-βBL Moiety;
1.25 (3H, d, J=6.3 Hz), 2.39–2.52 (1H, m), 2.53–2.81 (1H, m), 5.05–5.35 (1H, m)
DMC Moiety;
1.36 (6H, d, J=6.3 Hz), 3.83–4.05 (4H, m)

Example 6

Synthesis of Poly(Ester Carbonate) by Ring-Opening Copolymerization of (R)-βBL with 4-Methyl-1,3-dioxan-2-one (hereinafter abbreviated as "MTC"):

Reaction was carried out in the same manner as with Example 1 (2), with the exception that 6.15 g (71.5 mmol) of (R)-βBL, 0.83 g (7.15 mmol) of MTC and 0.0201 g (0.0179 mmol) of 1-chloro-3-ethoxytetrabutyldistannoxane were used, to obtain 6.39 g (yield: 91.5%) of the titled polymer.

$^1$H-NMR (400 MHz, CDCl$_3$) δ ppm:

(R)-βBL Moiety;
  1.18–1.40 (3H, m), 2.41–2.53 (1H, m), 2.54–2.69 (1H, m), 5.05–5.35 (1H, m),
MTC Moiety;
  1.18–1.40 (3H, m), 1.80–2.04 (2H, m), 4.06–4.28 (2H, m), 4.78–4.94 (1H, m).

Example 7

Synthesis of Poly(Ester Carbonate) by Ring-Opening Copolymerization of (R)-βBL with 4,6-Dimethyl-1,3-dioxan-2-one (hereinafter abbreviated as "DMTC"):

Reaction was carried out in the same manner as with Example 1 (2), with the exception that 2.56 g (29.7 mmol) of (R)-βBL, 0.43 g (3.30 mmol) of DMTC and 0.0093 g (0.0083 mmol) of 1-chloro-3-ethoxytetrabutyldistannoxane were used, to obtain 0.66 g (yield: 72.1%) of the titled polymer.

$^1$H-NMR (400 MHz, CDCl$_3$) δ ppm:

(R)-βBL Moiety;
  1.28 (3H, d, J=6.3 Hz), 2.36–2.72 (2H, m), 5.05–5.35 (1H, m)
DMTC Moiety;
  1.31–1.40 (6H, m), 1.72–1.86 (2H, m), 4.71–5.05 (2H, m)

Comparative Example 1

Synthesis of Poly(Ester Carbonate) by Ring-Opening Copolymerization of (R,S)-βBL with TMC:

Reaction was carried out in the same manner as with Example 1 (2), with the exception that 3.26 g (37.9 mmol) of (R,S)-βBL, 0.43 g (4.21 mmol) of TMC and 0.0118 g (0.0105 mmol) of 1-chloro-3-ethoxytetrabutyldistannoxane were used, to obtain 3.20 g (yield: 86.7%) of the titled polymer.

Comparative Example 2

Synthesis of Poly(Ester Carbonate) by Ring-Opening Copolymerization of (R)-βBL with 4-Butyl-6-methyl-1,3-dioxan-2-one (hereinafter abbreviated as "BMC"):

Reaction was carried out in the same manner as with Example 1 (2), with the exception that 2.84 g (33.0 mmol) of (R)-βBL, 0.58 g (3.67 mmol) of BMC and 0.0206 g (0.0183 mmol) of 1-chloro-3-ethoxytetrabutyldistannoxane were used, to obtain 2.47 g (yield: 72.2%) of the titled polymer.

$^1$H-NMR (400 MHz, CDCl$_3$) δ ppm:

(R)-βBL Moiety;
  1.28 (3H, d, J=6.3 Hz), 2.36–2.72 (2H, m), 5.05–5.35 (1H, m)
BMC Moiety;
  0.88–0.90 (3H, m), 1.27–1.35 (4H, m), 1.52–1.68 (2H, m), 1.85–2.00 (2H, m), 4.08–4.22 (2H, m), 4.75–4.83 (1H, m)

Test Example 1

Tests of Physical Properties of the Copolymers:

For the copolymers prepared in the above-mentioned examples and comparative examples, the composition and the content ratio of the monomers, the weight-average molecular weight (Mw), the number-average molecular weight (Mn), the glass transition temperature (Tg), the melting point (Tm), the decomposition point (TG) and the specific rotation were determined, respectively.

The composition and the content ratio of the monomers, Mw and Mn are shown in Table 1, and Tg, Tm, TG and the specific rotation are shown in Table 2.

TABLE 1

| | Monomers | | | |
|---|---|---|---|---|
| | Composition | Content Ratio | Mw (×10$^3$) | Mn (×10$^3$) |
| Example No. | | | | |
| 1 | (R)-βBL/TMC | 91/9 | 210 | 110 |
| 2 | (R)-βBL/TMC | 89/11 | 126 | 50 |
| 3 | (R)-βBL/TMC | 50/50 | 130 | 72 |
| 4 | (R)-βBL/TMC | 21/79 | 150 | 78 |
| 5 | (R)-βBL/DMC | 96/4 | 140 | 79 |
| 6 | (R)-βBL/MTC | 92/8 | 110 | 37 |
| 7 | (R)-βBL/DMTC | 94/6 | 74 | 23 |
| Comparative Example No. | | | | |
| 1 | (R,S)-βBL/TMC | 89/11 | 240 | 130 |
| 2 | (R)-βBL/BMC | 94/6 | 43 | 19 |

TABLE 2

| | Tg (°C.) | Tm (°C.) | TG (°C.) | Specific Rotation [α]$_D^{25}$(c=1) |
|---|---|---|---|---|
| Example No. | | | | |
| 1 | 0.04 | 125.9 | 275.0 | −1.50 |
| 2 | −0.10 | 119.4 | 291.4 | −0.40 |
| 3 | −9.12 | — | 282.5 | 0.39 |
| 4 | −15.8 | — | 294.8 | 0.29 |
| 5 | 3.95 | 136.0 | 273.1 | −1.00 |
| 6 | 2.58 | 123.1 | 283.7 | −7.01 |
| 7 | 5.94 | 130.9 | 285.8 | −6.76 |
| Comparative Example No. | | | | |
| 1 | 2.30 | 59.4 | 286.0 | 0.00 |
| 2 | −2.00 | 139.2 | 284.6 | −3.43 |

Test Example 2

Biodegradability Test of the Copolymers:

For the copolymers prepared in the examples and comparative examples, biodegradability tests were carried out, in accordance with the degradation test of chemical substances by microorganisms specified in "Test Methods for Novel Chemical Substances" (Kanpogyo: Bureau certified No. 5, Yakuhatsu: Bureau certified No. 615, and 49 Kikyoku: Bureau certified No. 392, Jul. 13, 1974) and the contents described in Y. Doi, A. Segawa and M. Kunioka, *Int. J. Biol. Macromol.*, Vol. 12, 106, April, 1990.

That is, films of the sample copolymers (1 cm×1 cm, 0.15–0.3 mm in thickness) were prepared by dissolving the copolymers obtained in the examples and comparative examples in chloroform, pouring the resulting solutions into petri dishes, and allowing the solvent to be evaporated to dryness. Using standard activated sludge (purchased from Kagakuhin Kensa Kyokai, a foundational juridical person, on Oct. 22, 1992) under the conditions of 500 ppm (600 ml), pH 6.0–7.0 and 25° C. 20 to 42 mg of each of the films was placed in a 50-ml flask to conduct the test by the use of a shakable constant temperature water bath manufactured by TAITEC. After the elapses of 2 weeks and 4 weeks, the weight of the polymer film was measured to find the residual rate by weight ratios. The results are shown in Table 3.

TABLE 3

| | Residual Rate by Weight | |
|---|---|---|
| | After 2 Weeks (%) | After 4 Weeks (%) |
| Example No. | | |
| 1 | 87 | 52 |
| 2 | 70 | 37 |
| 3 | 72 | 49 |
| 4 | 86 | 62 |
| 5 | 87 | 50 |
| 6 | 69 | 38 |
| 7 | 71 | 42 |
| Comparative Example No. | | |
| 1 | 98 | 95 |
| 2 | 94 | 88 |

This result showed that the polymer films obtained in the examples underwent degradation to nearly 50% or more after the elapse of 4 weeks. As compared with these, the polymer films of the comparative examples were little degraded.

While the invention has been described in detail and with reference to specific embodiments thereof, it will be apparent to one skilled in the art that various changes and modifications can be made therein without departing from the spirit and scope thereof.

What is claimed is:

1. A biodegradable optically active copolymer represented by general formula (I):

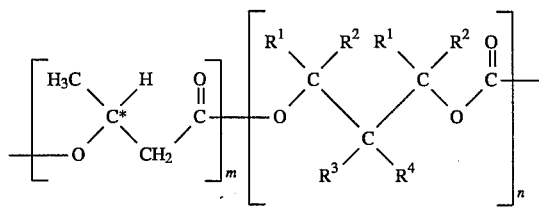

wherein $R^1$, $R^2$, $R^3$ and $R^4$ each represents a hydrogen atom or a methyl group; m and n each represents a natural number wherein the sum thereof gives 10 to 5,000; and C* represents an asymmetric carbon atom.

2. A process for producing a biodegradable optically active copolymer represented by general formula (I):

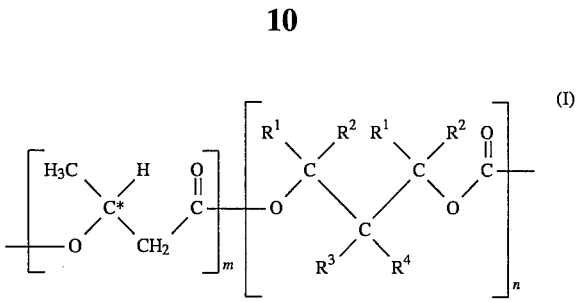

wherein $R^1$, $R^2$, $R^3$ and $R^4$ each represents a hydrogen atom or a methyl group; m and n each represents a natural number wherein the sum thereof gives 10 to 5,000; and C* represents an asymmetric carbon atom, comprising copolymerizing optically active β-butyrolactone with a cyclic carbonate by ring-opening copolymerization in the presence of a catalyst, wherein the catalyst is a distannoxane catalyst represented by the following formula (IV):

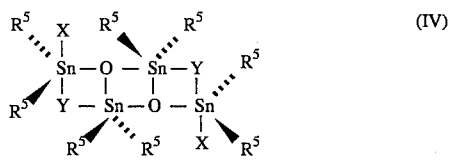

wherein $R^5$ represents a lower alkyl group or a phenyl group; X represents a halogen atom or —NCS; and Y represents a halogen atom, a hydroxyl group, a lower alkoxyl group, a phenoxy group or —NCS.

3. A biodegradable optically active copolymer as in claim 1, wherein the configuration of the asymmetric carbon atom is R-form.

4. A biodegradable optically active copolymer as in claim 1, wherein in general formula (I), $R^1$, $R^2$, $R^3$ and $R^4$ each represents a hydrogen atom.

5. A biodegradable optically active copolymer as in claim 1, wherein in general formula (I), $R^1$ and $R^2$ each represents a hydrogen atom and $R^3$ and $R^4$ each represents a methyl group.

6. A biodegradable optically active copolymer as in claim 1, wherein in general formula (I), $R^1$ represents a methyl group and $R^2$, $R^3$ and $R^4$ each represents a hydrogen atom.

7. A biodegradable optically active copolymer as in claim 1, wherein the sum of (m+n) is from 500 to 3,000.

8. A process for producing a biodegradable optically active copolymer as in claim 2, wherein the distannoxane catalyst is selected from the group consisting of 1,3-dichloro-1,1,3,3-tetrabutyldistannoxane, 1,3-dichloro-1,1,3,3-tetraphenyldistannoxane, 1,3-dibromo-1,1,3,3-tetrabutyldistannoxane, 1-chloro-3-hydroxy-1,1,3,3-tetrabutyldistannoxane, 1-bromo-3-hydroxy-1,1,3,3-tetrabutyldistannoxane, 1-chloro-3-ethoxy-1,1,3,3-tetrabutyldistannoxane, 1-chloro-3-phenoxy-1,1,3,3-tetraphenyldistannoxane, 1-bromo-3-phenoxy-1,1,3,3-tetrabutyldistannoxane, 1-chloro-3-(isothiocyanato)-1,1,3,3-tetrabutyldistannoxane, 1-hydroxy-3-(isothiocyanato)-1,1,3,3-tetrabutyldistannoxane, 1-(isothiocyanato)-3-methoxy-1,1,3,3-tetrabutyldistannoxane, 1-(isothiocyanato)-3-phenoxy-1,1,3,3-tetrabutyldistannoxane, 1,3-bis(isothiocyanato)-1,1,3,3-tetrabutyldistannoxane, and 1,3-bis(isothiocyanato)-1,1,3,3-tetramethyldistannoxane.

9. A process for producing a biodegradable optically active copolymer as in claim 2, wherein the distannoxane catalyst is 1-chloro-3-ethoxytetrabutyl-1,1,3,3-distannoxane or 1-hydroxy-3-(isothiocyanato)-1,1,3,3-tetrabutyldistannoxane.

10. A process for producing a biodegradable optically active copolymer as in claim 2, wherein the optically active β-butyrolactone is R-form.

11. A process for producing a biodegradable optically active copolymer as in claim 2, wherein the cyclic carbonate is selected from the group consisting of 1,3-dioxan-2-one, 4,4-dimethyl-1,3-dioxane-2-one, 4-methyl-1,3-dioxan-2-one, 5-methyl-1,3-dioxan-2-one, 4,5-dimethyl-1,3-dioxan-2-one, 4,6-dimethyl-1,3-dioxan-2-one, 4,5,6-trimethyl-1,3-dioxan-2-one, and 4,5,5,6-tetramethyl-1,3-dioxan-2-one.

12. A process for producing a biodegradable optically active copolymer as in claim 2, wherein the cyclic carbonate is selected from the group consisting of 1,3-dioxan-2-one, 5,5-dimethyl-1,3-dioxan-2-one, 4-methyl-1,3-dioxan-2-one, and 4,6-dimethyl-1,3-dioxan-2-one.

13. A poly(ester carbonate) obtained by ring-opening copolymerization of (R)-β-butyrolactone and 4-methyl-1,3-dioxan-2-one.

14. A process for producing a poly(ester carbonate) comprising reacting (R)-β-butyrolactone with 4-methyl-1,3-dioxan-2-one in the presence of 1-chloro-3-ethoxytetrabutyl-1,1,3,3-distannoxane.

* * * * *